Nov. 1, 1932.   G. J. STREZYNSKI ET AL   1,885,154
PROCESS OF PRODUCING CONCENTRATED AND PURIFIED RUBBER LATEX
Filed Aug. 8, 1930
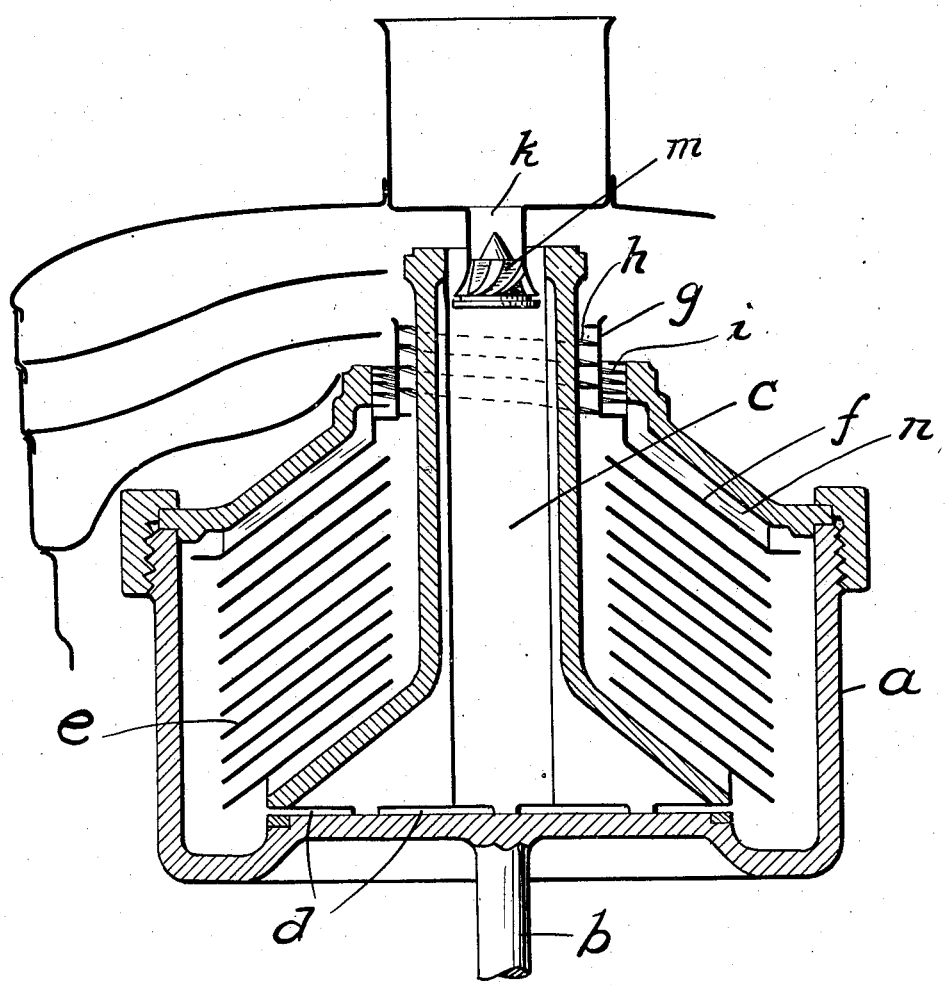
INVENTORS
George J. Strezynski
Norman A. Fraser
BY
ATTORNEYS.

Patented Nov. 1, 1932

1,885,154

UNITED STATES PATENT OFFICE

GEORGE J. STREZYNSKI AND NORMAN A. FRASER, OF POUGHKEEPSIE, NEW YORK, ASSIGNORS TO THE DE LAVAL SEPARATOR COMPANY, OF NEW YORK, N. Y., A CORPORATION OF NEW JERSEY

PROCESS OF PRODUCING CONCENTRATED AND PURIFIED RUBBER LATEX

Application filed August 8, 1930. Serial No. 474,050.

Rubber latex, as obtained from the trees, is a fluid resembling, in appearance, cows' milk and cream. It consists of an aqueous serum in which are suspended or emulsified from about 25 to 36 per cent. of rubber globules and which also contains from 3 to 6 per cent. of other materials in suspension or solution.

These other materials comprise, mainly, proteins, resins, mineral matter and quebrachitol.

The mineral matter consists principally of foreign dirt and should be removed.

The resins are usually objectionable. They interfere with making waterproof material and should ordinarily be removed as far as possible.

Quebrachitol is a water-soluble component which interferes seriously with the production of waterproof articles. Its complete removal is highly desirable and the removal of the larger part of it is practically necessary, in order to produce an entirely satisfactory rubber.

The removal of water soluble constituents is necessary in order to make rubber articles having high electrical insulating properties.

After the latex is obtained from the trees, it has a strong tendency to rapidly coagulate. This is prevented by the addition of a preservative, such as ammonia. The following is a typical example of an analysis of rubber latex as received in the United States.

|  | Total | Based on rubber |
|---|---|---|
| Watery serum and ammonia | About 61. | About 177. |
| Rubber hydrocarbons | 34.4 | 100. |
| Proteins | 2.2 | 6.4 |
| Resins | 1.3 | 3.8 |
| Quebrachitol | .8 | 2.3 |
| Mineral matter | .3 | .87 |

The last four constituents are hereinafter designated "impurities", although it will be understood that the proteins are less objectionable than the other of said constituents and the retention of a substantial proportion of them is usually desirable.

It is also desirable to concentrate the latex so as to materially increase the proportion of rubber. Mere concentration by the use of centrifuges presents no substantial difficulties. Centrifugal concentration, however, as heretofore practiced, involves the separation of a comparatively small amount of a latex containing an increased percentage of rubber hydrocarbons but a minor proportion of the original quantity thereof, and a comparatively large amount of a dilute latex containing a decreased percentage of rubber hydrocarbons but a major proportion of the original quantity thereof. The dilute latex is acid-treated to recover the rubber by coagulation. This rubber is of low grade and can be used only in the production of rubber articles of decidedly inferior quality and value.

The object of the present invention is to effect the removal in large part of the impurities including the practical elimination of the quebrachitol, and to produce a concentrated latex containing a very large proportion of the original rubber hydrocarbons.

The process may be carried out with the use of centrifugal separator bowls of known type, but only with difficulty. We shall describe several ways of carrying out the process which are entirely practicable with the use of bowls not specially designed; but a completely satisfactory practice of the process involves the use of a special separator of maximum efficiency and capacity in which frothing and emulsification are minimized both at the infeed and the outlet. A bowl which it is preferred to use is illustrated in the figure, which is a vertical cross-sectional view.

Preliminarily to the description of the process, the bowl shown in the drawing will be described. The bowl body $a$, supported an driven by a spindle $b$, contains a central tubular shaft or receiving chamber $c$, from which, through a narrow, and more or less complete circular opening $d$, the latex is fed into the separating chamber of the bowl. This separating chamber contains a "liner" $e$, comprising a number of frusto-conical discs, and held down on the expanded lower end of the tubular shaft $c$ by a top disc $f$, which is forced down by wings $n$ on the under side of the bowl top. The top disc $f$ has an upstanding neck $g$, on the inside of which the lighter separated ingredient is discharged, and on the outside of which the heavier separated ingredient is discharged. Within the neck $g$ is inserted a number of helical guides $h$ providing a plurality of helical troughs through which the lighter separated constituent must flow in order to reach the exit. A similar set of helical guides $i$ may be placed in the neck $j$ of the bowl to provide outflow channels for the heavier separated constituent.

In the feed tube $k$, through which the mixture to be separated (in this case the original latex) is fed into the receiving chamber $c$, is inserted a plug $m$ provided with helical grooves extending around its periphery and through which the incoming latex must flow. The use of these helical grooves greatly accelerates the rate of flow of the latex so that, when it is discharged into the receiving chamber $c$, its angular speed approaches that of the bowl, whereby agitation, emulsification or churning is very materially reduced. This feeding contrivance is more fully described in an application filed by Alan E. Flowers, August 1, 1930, Serial No. 472,384.

The feed from the receiving chamber to the separating chamber and the helical troughs through which the separated constituents are discharged are more fully described in an application filed by George J. Strezynski, August 1, 1930, Serial No. 472,277. The advantage of these structural features, of which the discharge device is particularly important, is to equally distribute the "work" throughout all sectors of the bowl, notwithstanding that the bowl may not be perfectly balanced. The resultant increase in efficiency and capacity is of great importance in the centrifugal separation of a material, such as rubber latex, which can be concentrated, without loss of a large proportion of rubber, with extreme difficulty.

In carrying out our process, the first step is to run the latex through a centrifugal separator, which is preferably one constructed as above described, but may be, much less desirably, a commercial separator of known type. There are discharged from the centrifuge a more or less concentrated latex and a more or less dilute latex. We have found that the concentrate is easily dispersible in pure water or in water to which a small quantity of ammonia has been added and that the quebrachitol, whose elimination is desired, will be because of its solubility, diluted in proportion to the quantity of water added. It is practicable to add to the concentrate as much as several times as much water as concentrate. We prefer to add about one and one-half volumes of water, with a little ammonia, to one volume of concentrate and thoroughly mix. This diluted concentrate is now centrifugally separated, and there are separately discharged, as before, concentrated latex and dilute latex. A large proportion of the water and much of the resins and mineral matter are carried off in the water phase, leaving a comparatively small proportion in the second rubber concentrate. This operation of washing with water and centrifuging may be repeated; that is, there may be two, three of more centrifugations with a water washing between successive centrifugations. Preferably progressively smaller volumes of water are added. Each operation effects a material reduction in the proportion of the impurities. The ultimate concentrate contains a very small percentage of the highly objectionable quebrachitol, and when dried, its waterproofing qualities are very greatly enhanced.

The following is a typical analysis of a third concentrate:

|  | Total | Based on rubber |
|---|---|---|
| Water, etc | About 38.6 | 65. |
| Rubber | About 59.07 | 100. |
| Proteins | About 1.28 | 2.145 |
| Resins | About .96 | 1.61 |
| Quebrachitol | About .02 | .035 |
| Mineral matter | About .07 | .12 |

Of the impurities in the rubber there had been removed nearly 70% of the proteins, nearly 60% of the resins, over 85% of the mineral matter and (most important of all) nearly 98½% of the very objectionable quebrachitol.

The amount of rubber hydrocarbons contained in the purified and concentrated latex is from seventy to ninety per cent. of the total amount of rubber contained in the original latex. The degree of concentration, that is, the proportion of rubber to watery serum, is nearly three times that of the original latex, and this degree of concentration may be increased as hereinafter described. Not only is a rubber of the above composition one of high concentration and of extraordinary purity, but it comprises a comparatively large proportion of the original rubber hydrocarbons, so that the proportion of rubber hydrocarbons that must be utilized as low grade rubber is relatively small.

There are different ways of carrying out the process. As is well known, centrifugal separators may be adjusted to give a high concentration and a low recovery or a low concentration and a high recovery. It is quite possible, especially with the use of a separator such as described, to secure a concentration considerably in excess of approximately 60%, as in the example given. It is quite possible to secure a concentration as high as 75% or even higher. Usually, however, a too high concentration will not freely discharge from the bowl, and, moreover, it is advisable not to aim at a very high concentration, since a lower concentration is effective to remove the desired proportions of impurities, and a larger proportion of the original rubber hydrocarbons are saved for the high grade rubber.

In any way of carrying out the process, however, there remains, in the dilute phase, a considerable, although minor, proportion of the original rubber, mainly in the form of globules of much smaller sizes, the larger sized globules being nearly all in the concentrate. The dilute phase may contain from 10 to 25% of rubber. It is obviously desirable to recover as much as possible of this rubber in a comparatively pure state. We have found that this result can be attained if the dilute phase is run at a relatively slow feed through a centrifugal separator adjusted for maximum recovery rather than maximum concentration. In other words, the complete process involves running the original latex at a relatively high rate of feed through a centrifugal separator adjusted for a comparatively high concentration and thereby concentrating a major proportion of the larger rubber globules; and then running the dilute phase through at a relatively low rate of feed through a centrifugal separator adjusted for a comparatively high recovery.

Of course, it will be understood that the dilute phase produced in the original centrifugal separation contains a higher proportion of impurities than the original latex. Consequently the concentrate produced in the centrifugal separation of the dilute phase does not contain as small a proportion of impurities as is desired, although it will ordinarily contain a substantially smaller proportion of impurities than the original latex. However, the concentrate produced in the centrifugal centrifugation of the dilute phase may be further purified by washing with water and centrifuging, to obtain a sub-concentrate, in the same way, as hereinbefore described, that the concentrate resulting from the separation of the original latex is washed and centrifuged to obtain a sub-concentrate.

It is also practicable to take the concentrate produced in the centrifugal separation of the dilute phase and mix it with the original latex or run it into the separator along with the original latex. In other words, it is practicable to so carry on the centrifugation of the dilute phase resulting from the first separation as to produce a concentrate quite similar, except for the size of the rubber globules, in its composition to the original latex. By centrifuging the last named concentrate along with the original latex, a substantially larger proportion of the rubber hydrocarbons will be saved for the most highly purified product.

It is also possible to so conduct the centrifugation of the dilute phase as to produce a concentrate more or less similar to one of the sub-concentrates which is produced by washing a concentrate with water and centrifuging as hereinbefore described. The concentrate of the dilute phase along with said sub-concentrate (first washing with water either or both) may then be centrifuged. This variation or modification of the process, which is obviously an equivalent of the one just previously described, is also adapted to save additional rubber for the most highly purified product.

The dilute phase of any centrifugation may be treated as described so as to ultimately save nearly all the rubber hydrocarbons for the most highly purified product. The process may be carried to the point where the dilute phase contains so small a proportion of rubber and so large a percentage of impurities that it is not economical to effect its recovery and purification.

In all centrifugal bowls, so far as we know, that heretofore have been in general use, there is a great amount of emulsification which occurs, by reason of the high rotary speed of the separator and the high linear speed of the wall of the receiving chamber, when the latex is fed thereinto from the stationary feed tube. As is well understood, such emulsification makes separation of the components much more difficult. In addition to this, in all centrifugal bowls, so far as we know, there have been unequal rates of liquid flow through different sectors of the bowl, due, in part, to the way in which the liquid is fed thereto and due, usually in still greater degree, to the bowl being out of perfect balance. This inequality in rates of flow imposes on certain sectors of the separating chamber the burden of the work and reduces the capacity of the separator. The localized rapid flow carries into the concentrated lighter component some of the heavier components of the mixture being separated, and vice versa, making impossible a substantially complete separation of components having small differences in specific gravity. This phenomenon of inequality of flow is one which, it is believed, is quite, or at least comparatively, unknown.

In the purification of rubber latex, these defects in the ordinary bowl are especially unfavorable to effective purification, although by practicing the process hereinbefore described, good results are secured with ordinary bowls. To secure the best results, however, we have found it necessary to use the bowl hereinbefore described. By the use of this bowl, we have found that, by carefully adjusting the rate of feed to the speed of the separator, we are able, in a single separation, to make a selective differential separation dividing the original quantity of latex into one phase containing most of the rubber with a relatively small proportion of watery serum and impurities and another phase containing most of the serum and a relatively large proportion of impurities. Depending on the quality and condition of the latex, the rate of feed should vary from four to eight per cent. of the capacity of an ordinary cream separator of similar cubical content. For example, in a separator having a content of forty cubic inches, the latex should be fed into the bowl at the rate of from three to eight gallons per hour.

While we have described the process as applied to the preserved ($NH_3$) latex commercially available in the United States, the process may be applied to unpreserved latex, although in such application it is advisable, if not necessary, to apply the process before the rubber has coagulated to a serious extent. The process is also applicable to compounded latices. The process is also applicable to rubber that is not prepared directly from latex. It is to be understood, therefore, that the process is not limited to any particular form of latex and may even be applied to rubber solutions which are not, strictly speaking, "latex"; this word being intended to be used in a broad sense as covering rubber latex or its equivalents.

Where, in defining the invention, dilution with water is specified, it will be understood that there may be substituted for water any liquid which is of adequate specific gravity, which is miscible with the serum, and which will not emulsify with the rubber to a substantially greater degree than water, as for example, a weak solution of ammonia in water.

Having now fully described our invention, what we claim and desire to protect by Letters Patent is:

1. The process of effecting the purification of rubber latex and securing a high concentration of the bulk of the rubber which comprises separating the latex into a rubber concentrate and a dilute rubber phase, obtaining a second rubber concentrate by centrifuging the dilute phase, and concentrating the second rubber concentrate together with the first named latex.

2. The process of concentrating and purifying rubber latex which comprises centrifugally separating the latex into a rubber concentrate and a dilute rubber phase, diluting said rubber concentrate with water, centrifugally separating each separated constituent into a rubber concentrate and a dilute rubber phase, and re-concentrating the rubber concentrate produced by centrifuging the first named dilute rubber phase by centrifuging it with the said latex.

3. That process of collecting rubber from latex which comprises centrifugally concentrating a major portion of the larger rubber globules at a relatively high rate of feed in a separator adjusted for high concentration and from the residue centrifugally collecting and concentrating a major portion of the smaller rubber globules at a relatively low rate of feed in a separator adjusted for relatively high recovery.

4. That process of collecting rubber from latex which comprises centrifugally separating the latex into a rubber concentrate containing a major proportion of the larger rubber globules and a dilute rubber phase at a relatively high rate of feed in a separator adjusted for high concentration, diluting the concentrate with water, centrifugally separating the concentrate into a rubber concentrate and a dilute rubber phase, and from the first named dilute phase centrifugally collecting and concentrating relatively small rubber globules at a relatively low rate of feed in a separator adjusted for comparatively high recovery.

In testimony of which invention, we have hereunto set our hands, at Poughkeepsie, N. Y., on this 29 day of July, 1930.

G. J. STREZYNSKI.
NORMAN A. FRASER.